(12) United States Patent
Bergstrøm Graabæk

(10) Patent No.: US 10,873,722 B2
(45) Date of Patent: Dec. 22, 2020

(54) MODULAR TV ARCHITECTURE

(71) Applicant: Bang & Olufsen A/S, Struer (DK)

(72) Inventor: Jakob Bergstrøm Graabæk, Holstebro (DK)

(73) Assignee: BANG & OLUFSEN A/S, Struer (DK)

( * ) Notice: Subject to any disclaimer, the term of this patent is extended or adjusted under 35 U.S.C. 154(b) by 0 days.

(21) Appl. No.: 16/304,033

(22) PCT Filed: May 5, 2017

(86) PCT No.: PCT/DK2017/050144
§ 371 (c)(1),
(2) Date: Nov. 21, 2018

(87) PCT Pub. No.: WO2017/202427
PCT Pub. Date: Nov. 30, 2017

(65) Prior Publication Data
US 2019/0342515 A1 Nov. 7, 2019

(30) Foreign Application Priority Data
May 24, 2016 (DK) .................... 2016 00311

(51) Int. Cl.
*H04N 5/64* (2006.01)
*H04N 5/655* (2006.01)
*F16M 11/20* (2006.01)
*F16M 11/22* (2006.01)
*F16M 13/02* (2006.01)

(52) U.S. Cl.
CPC ......... *H04N 5/642* (2013.01); *F16M 11/2014* (2013.01); *F16M 11/22* (2013.01); *F16M 13/022* (2013.01); *H04N 5/655* (2013.01)

(58) Field of Classification Search
CPC ...... H04R 2499/15; H04R 5/02; H04R 1/403; H04R 1/026; H04R 1/02; H04R 1/025; H04R 2201/021; H04R 2420/07; H04N 5/64; H04N 5/642; A61G 12/005
USPC ........ 348/836, 839; 381/306, 332, 333, 361, 381/386, 388
See application file for complete search history.

(56) References Cited

U.S. PATENT DOCUMENTS 5,982,537 A * 11/1999 Koizumi .................. H04R 5/02
359/444
9,265,346 B1 2/2016 Forney
(Continued)

OTHER PUBLICATIONS

"Mount-It! Soundbar Bracket Universal Sound Bar TV Mount for Mounting Above or Under TV, Fits Sonos, Samsung, Sony, Vizio, Adjustable Arm Fits 23 to 65 Inch TVs, 33 Lbs Weight Capacity Black (MI-SB41)" Amazon.com , Sep. 25, 2012 https://www.amazon.com/dp/B01M5FZ8O0/ref=sspa_dk_detail_3?psc=1&pd_rd_i=B01M5FZ8.*

*Primary Examiner* — Nathnael Aynalem
(74) *Attorney, Agent, or Firm* — Berg Hill Greenleaf Ruscitti, LLP.

(57) ABSTRACT

Modular audio/video entertainment system, said system comprising three modules: a screen unit, a loudspeaker unit and a control unit, where means are provided for assembling and disassembling the modules, where said means comprises one or more bracket assemblies, where one end of the one or more bracket assemblies is fastened in the loudspeaker unit, and another end of the one or more bracket assemblies engages means provided on the rear or bottom side of the screen, normally used for the screen's standard table or floor stand or wall mount.

10 Claims, 15 Drawing Sheets

(56) References Cited

U.S. PATENT DOCUMENTS

| | | | |
|---|---|---|---|
| 9,344,667 B2 * | 5/2016 | Sculler | H04N 5/64 |
| 2005/0185801 A1 * | 8/2005 | McCarty | H04N 5/64 |
| | | | 381/87 |
| 2009/0238384 A1 | 9/2009 | Beauchamp | |
| 2010/0104124 A1 * | 4/2010 | Abraham | H04R 1/028 |
| | | | 381/333 |
| 2010/0158299 A1 | 6/2010 | Liu | |
| 2011/0135133 A1 | 6/2011 | Choi et al. | |
| 2012/0255919 A1 | 10/2012 | Jones et al. | |
| 2012/0275631 A1 | 11/2012 | Caldes et al. | |
| 2014/0204564 A1 * | 7/2014 | Mukaide | H04N 5/64 |
| | | | 362/97.1 |

\* cited by examiner

MODULAR TV ARCHITECTURE

CROSS REFERENCE TO RELATED APPLICATIONS

This application is a national stage application of International Application No. PCT/DK2017/050144, filed May 5, 2017; which claims the benefit of Danish Patent Application No. PA 2016-00311, filed May 24, 2016, the disclosures of each of which are incorporated herein by reference.

FIELD OF THE INVENTION

The present invention relates to a modular audio/video entertainment system.

BACKGROUND OF THE INVENTION

It is well-known to buy audio/video entertainment systems comprising a screen, a tuner/receiver/control unit which are connected to a sound system usually comprising an audio processor/amplifier and a number of loudspeakers. In other examples the screen, tuner, audio processor, amplifier, loudspeakers and control part are assembled in one integrated unit like traditional television systems. Particularly where high-end systems are concerned emphasis is both on the quality of the sound and picture reproduction and the industrial design and appearance of the unit in its entirety. However, the technological development, particularly within the technology of screens and video processing, is advancing rapidly such that screen and video processing technology only a few years old may be outdated and do not provide the viewing experience a user could expect from a high-end system such that the expense connected with buying high-end systems is difficult to justify.

On the other hand, the advances in particularly sound technology are moving at a slower pace such that the sound reproduction system may be considered high quality and top of the line for a substantially longer time than the screen and video processing technology. This is due to the rapid development in the screen technology and the field of video coding and processing standards, whereas in the more traditional and mature fields of loudspeaker transducer and amplifier technology, advancement is somewhat slower. Within the field of audio processing, there are also rapid technology advances, but nowadays these can usually be implemented in the existing product's digital signal processing hardware and software, allowing for automatic product upgrades without the need for hardware upgrades, which would be needed in case of e.g. new video coding and processing standards.

US 20112/275631 and U.S. Pat. No. 9,265,346 both disclose modular audio/video systems, comprising a number of distinct modules which by means of brackets are assembled to constitute an entertainment system. The preamble of independent claim 1 reflects the prior art as disclosed in these documents.

OBJECT OF THE INVENTION

Consequently, there is a desire to be able to provide high-end audio/video entertainment systems which can keep up with current and future technology without huge expenses.

DESCRIPTION OF THE INVENTION

The present invention addresses this problem by providing a modular audio/video entertainment system, said system comprising two or more modules: a screen unit, a loudspeaker unit and a control unit, where means are provided for assembling and disassembling the modules, where said means comprise one or more bracket assemblies, where one end of the one or more bracket assemblies is fastened in the loudspeaker unit, and another end of the one or more bracket assemblies engages means provided on the rear or bottom side of the screen unit, normally used for the screen unit's standard table or floor stand or wall mount.

By providing assembly means in the shape of one or more brackets making it possible to connect the loudspeaker unit or the control unit to a screen unit it is possible to assemble what will appear as an integrated audio/video entertainment system. Furthermore, the one or more brackets makes it possible to mount different screens to the loudspeaker unit and control unit such that as screen technology advances or the desire for a larger or smaller screen should arise, it is possible to mount and integrate another screen in the modular audio/video entertainment system as described above.

The term "screen" may encompass any type of screen such as for example LCD, LED, OLED and any future screen technologies. In this connection both flat and curved as well as sphere shaped screens are considered as included within the term screen. As will be apparent from the disclosure of the present invention the screen technology is not an important aspect with the present invention. What is important with respect to the screen is its hardware configuration with respect to interfacing with a wall mount or table or floor stand, and the screens' control system and its ability to operate with the systems in the loudspeaker unit and control unit.

In a further advantageous embodiment, the control unit and the loudspeaker unit is one integrated member, where the upper part of the integrated member comprises a first mounting bracket being part of the one or more bracket assemblies, said mounting bracket has means for being fastened to an interface bracket, which interface bracket has means for engaging corresponding means in the rear side of the screen.

As the improvements in sound quality are advancing relatively slowly compared to the advances in screen technology, an integrated loudspeaker unit and control unit may be provided such that the control system both with respect to sound and picture as well as sound reproduction may be integrated in one unit. This facilitates added stability and the possibility of maintaining a coherent design.

Furthermore, the attachment means for the screen may in this embodiment be configured such that an interface bracket is provided which interface bracket will compensate for any variation in the rear side design of the screen, i.e. the design where the attachment means for wall mounts or table stands are provided such that the interface bracket will provide a fastening in one end to the bracket provided in the control unit or loudspeaker unit and in the other end provide fastening to the screen.

With this interface bracket it is possible to use a wide variety of screens with the loudspeaker unit/control unit simply by providing a suitable interface bracket for that particular combination of screen and loudspeaker unit/control unit. In a still further advantageous embodiment the control unit and the loudspeaker unit is one integrated member, where on an upper part of the integrated member a mounting bracket is provided, where said mounting bracket has one or more mounting surfaces, where the mounting surfaces are provided with means for engaging the back and/or bottom of a screen, where different mounting brackets having different means for engaging the back of different screens on their respective mounting surfaces, may be fastened on the upper part of the integrated member.

This embodiment is particularly interesting where it is foreseen that the loudspeaker unit/control unit shall be suitable to be combined with a certain brand or certain family of screens where the screens have more or less the same mounting means for mounting wall brackets and/or table or floor stands from generation to generation of screens and within a range of different screen sizes. Where this is the case, the bracket mounted on the loudspeaker unit/control unit will be designed such that they will be immediately fastenable to the corresponding means, i.e. the fastening means for the wall mount or table or floor stand in the rear side of the screen.

In a further advantageous embodiment, the system further comprises a rear cover said cover having an upper surface and a lower edge as well as an at least section-wise curved surface connecting said upper surface and lower edge. The cover serves to hide/cover both the bracket/interface bracket, i.e. the fastening means, as well as any wiring necessary between the rear side of the screen and the loudspeaker/control unit in order for these modules to cooperate. As the modular audio/video entertainment system according to the present invention will be perceived as a single free standing integrated unit, it is important to also provide a desirable design on the rear side as the modular audio/video entertainment system may be free standing and as such be accessible or viewable from any angle. Furthermore, by designing the rear cover in the manner described above it is possible to provide further stability between the loudspeaker unit and the screen such that the forces on the bracket and the fastening means used with the bracket may be lessened and distributed into the cover construction and as such distributed over a larger area thereby minimising the impact per area unit.

In most embodiments, the cover will have a fixed size in that the extent of the area on the rear side of the screen where attachment means to the loudspeaker unit/control unit is provided is relatively limited, and due to the geometrical balance when mounting a screen on a wall mount or table or floor stand, the engagement section will be substantially centrally placed on the rear side. Therefore, a substantially standard size cover may be provided which will be able to cover substantially all variations regardless of screen size. This in turn provides for a homogenous design of the modular audio/video entertainment system where it is possible to provide the same size loudspeaker unit and control unit and rear side cover regardless of the size of the screen whereby the modular audio/video entertainment system as such will be recognizable from its design regardless of the screen size which is the same as traditional televisions having the same design line but being available with different screen sizes.

In a still further advantageous embodiment of the invention the modular audio/video entertainment system is on the upper surface of the loudspeaker unit provided with a groove or ridge, in which groove or against said ridge the screen is placed, in order to obtain a fixed and common mounting plane between the loudspeaker unit and the screen. This groove or ridge ensures that the screen is mounted in a fixed position relative to the loudspeaker unit such that the bracket means are correctly positioned relative to the screen.

Furthermore, the groove/ridge also provides stability for the screen, particularly for large size screens, such that horizontal movement of the screen relative to the loudspeaker unit is avoided due to the contact along the ridge or in the groove between the loudspeaker unit and the screen. The groove/ridge provides a firm horizontal fixture.

The vertical fixture is provided by gravity and by means of the brackets, and whether it is a bracket system with a single bracket as explained above with reference to one embodiment, or a bracket system comprising an interface bracket as described above with reference to an alternative embodiment, a fixed and very stable connection is created between the screen and the loudspeaker unit.

In a still further advantageous embodiment of the invention the loudspeaker unit has a front surface having a first width and a first height, and first bottom, where one or more loudspeaker transducers are arranged for emitting sound from said front surface, first top and two first side surfaces connected to said front surface defining a first depth and where said screen has a front screen surface, said front screen surface having a second width and a second height, and second bottom, second top and two second side surfaces connected to said front screen surface defining a second depth, and where the control unit has a front surface having a third width and a third height, and third bottom, third top and two third side surfaces connected to said front surface defining a third depth, and where end covers are provided in order to cover at least a section of the loudspeakers' first side surfaces, and parts of the top surface, not covered by the screen's bottom surface when the screen is connected to the loudspeaker unit.

The end covers serve to provide coverage for that part of the loudspeaker unit which is not covered by the bottom surface of the screen. As it is foreseen that the loudspeaker unit may be wider than the width of the screen, the loudspeaker unit will extend in the width direction preferably on both sides of the screen. In order to ensure the symmetry, the end covers which are designed to cover both part of the top surface as well as the side surfaces of the loudspeaker unit may be provided in various dimensions such that depending on screen sizes and the relative width difference between a desirable screen size and the loudspeaker unit may be covered by selecting the appropriate end covers. Thereby the end covers become an integrated part of the design.

The end covers in a further advantageous embodiment are provided for different screen widths, said end covers optionally having one or more of the following characteristics different from the loudspeaker unit and/or screen: surface texture, color, width, material. By providing the end covers in different designs it is possible to customize the modular audio/video entertainment system to the user's particular desires, or such that it will be more suitable for a specific interior design or a fashion trend.

In a still further advantageous embodiment of the invention the bracket assemblies comprise interface means for attachment to a wall mount hinge. As the bracket assemblies have the strength to connect and stably hold the screen and the loudspeaker unit and control unit together as a single unit the bracket assemblies may further be the attachment point for a wall mounted hinge such that the entire modular audio/video entertainment system may be hingedly mounted on a wall. Naturally, the wall hinge may be motorized and controlled by a remote control.

In a still further advantageous embodiment the control unit comprises a communication module able to communicate with a remote control. In an exemplary embodiment, this is a Bluetooth remote control using the Wi-Fi®/Bluetooth® transceiver in the control unit. From there, the control commands for the screen are routed to all parts of the audio/video entertainment system. It could also be an infrared remote control, but that would require an infrared transceiver in the control unit.

In a still further advantageous embodiment the control unit comprises a combined WiFi®/Bluetooth® antenna/transceiver and/or a wireless loudspeaker antenna/transceiver, and/or where an access point is provided, by which access point access may be gained to the software controlling sound reproduction, signal processing for the screen. The Wi-Fi®/Bluetooth® antenna/transceiver naturally serves to provide access as a smart TV and furthermore as more and more entertainment is streamed, the installation of a Wi-Fi®/Bluetooth® antenna/transceiver in the modular audio/video entertainment system provides the possibility of streaming desirable features directly on the screen or from the loudspeakers. The screen unit may also have its own Wi-Fi®/Bluetooth® antenna/transceiver, used to stream smart TV content directly to the screen unit without occupying the Wi-Fi®/Bluetooth® antenna/transceiver in the control unit.

The wireless loudspeaker antenna/transceiver connected with necessary audio signal processing and software makes it possible to use a plurality of wireless loudspeakers in addition to the loudspeakers already integrated in the loudspeaker unit.

Furthermore, the Wi-Fi®/Bluetooth® antenna/transceiver or access point provides access to the software installed or embedded in the electronic circuitry inside the control unit and as such the software may be updated to fit the screen software drivers or the sound reproduction system may be controlled for example by installing a special software controlling the sound emission, for example by concentrating the sound to a specific listener position or to a specific field.

DESCRIPTION OF THE DRAWINGS

The invention will now be explained with reference to the accompanying drawings wherein.

DETAILED DESCRIPTION OF THE INVENTION

Figure 1:
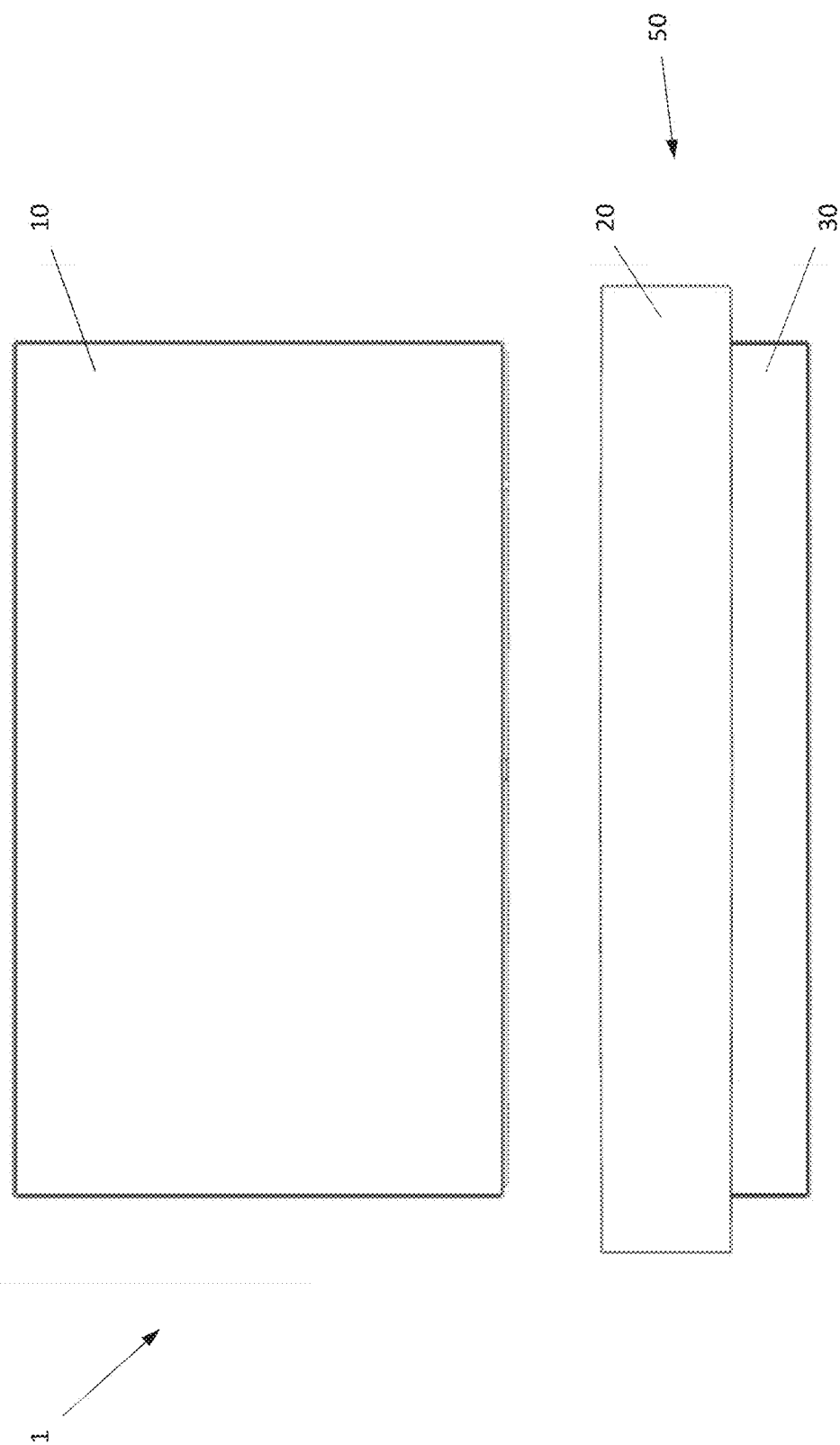
FIG. 1 illustrates the components of the modular audio/video entertainment system according to the invention

In FIG. 1 is schematically illustrated the components of the modular audio/video entertainment system according to the invention. The modular audio/video entertainment system 1 comprises a screen unit 10, a loudspeaker unit 20 and a control unit 30.

The detailed embodiment which will be described below will be described where the loudspeaker unit 20 and the control unit 30 is an integrated unit generally referred to as 50, but it is within the invention that the loudspeaker unit 20 and the control unit 30 may be separate units which may be assembled to one unit such that it is possible to maintain the loudspeaker unit 20 and only replace the control unit if advances in technology necessitates that the control of the loudspeakers and the screen is updated or modernized to such an extent that it cannot be carried out simply by software updates as will be explained below.

Figure 2:
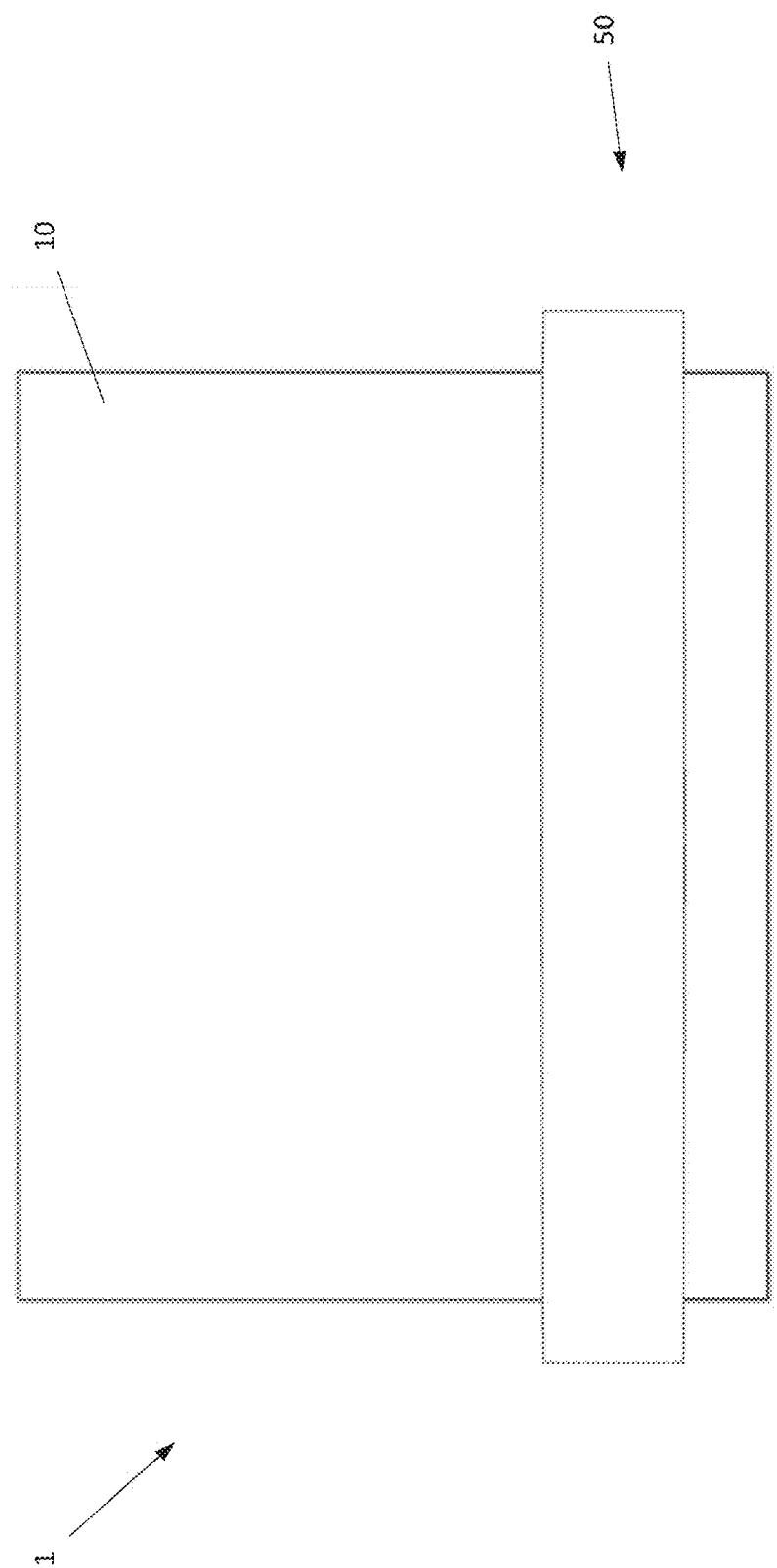
FIG. 2 illustrates the complete integrated modular audio/video entertainment system

Once the screen unit 10 is assembled with the integrated unit 50 it will have an appearance as a complete integrated modular audio/video entertainment system 1 as illustrated with reference to FIG. 2.

Figure 3:
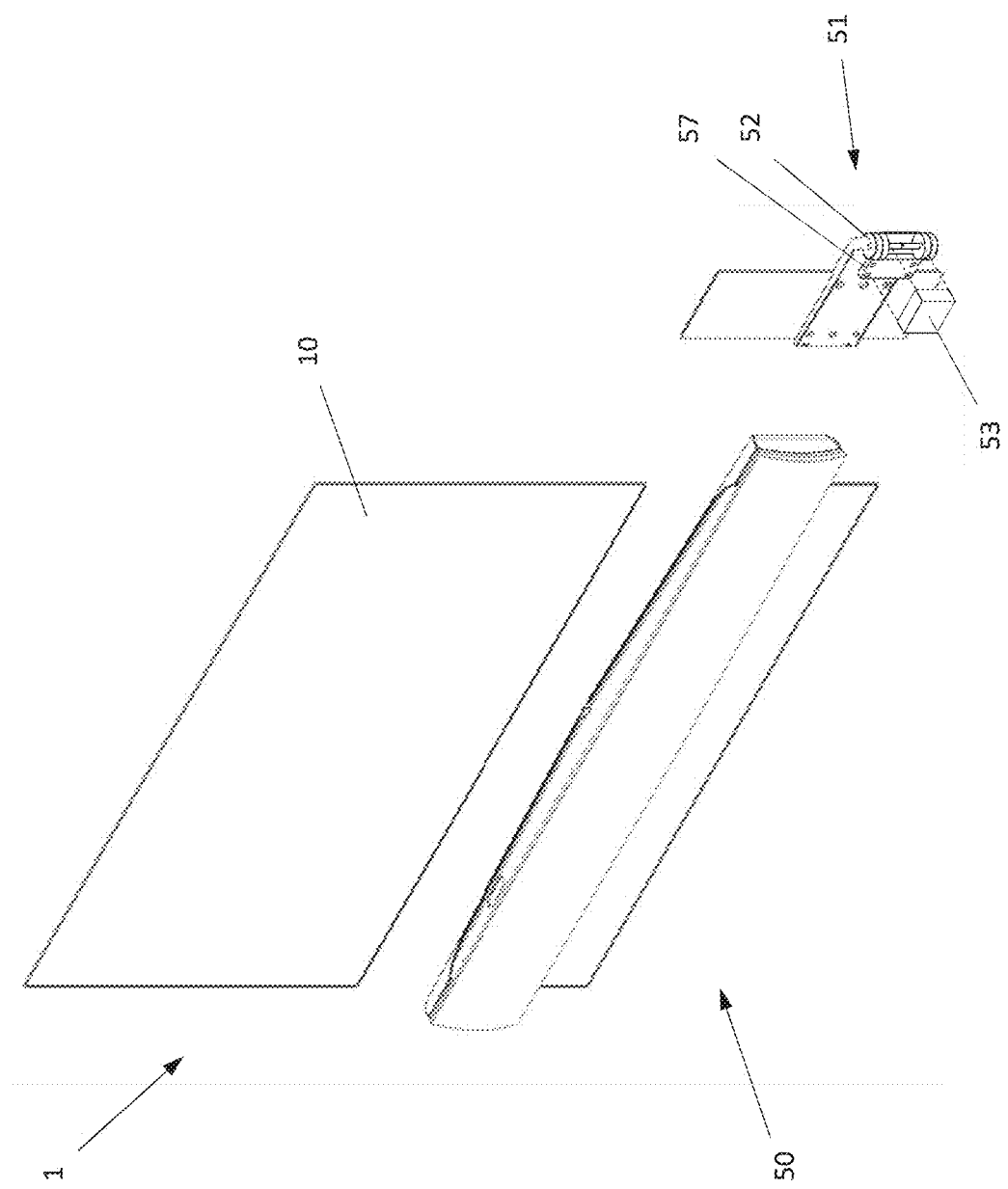
FIG. 3 illustrates the modular audio/video entertainment system provided with a wall mount in the shape of a wall hinge

In addition to the modular audio/video entertainment system 1 comprising a screen unit 10 and the integrated unit 50, a wall mount 51 in the shape of a wall hinge 52 may likewise be provided as illustrated with reference to FIG. 3. The wall hinge 52 facilitates that the entire modular audio/video entertainment system 1 may be mounted on a wall and that the viewing angle may be changed simply by swivelling the hinge 52. The wall hinge 52 may be provided with a remote controlled motor unit 53 such that a remote control may control the pivoting of the audio/video entertainment system 1.

Figure 4:
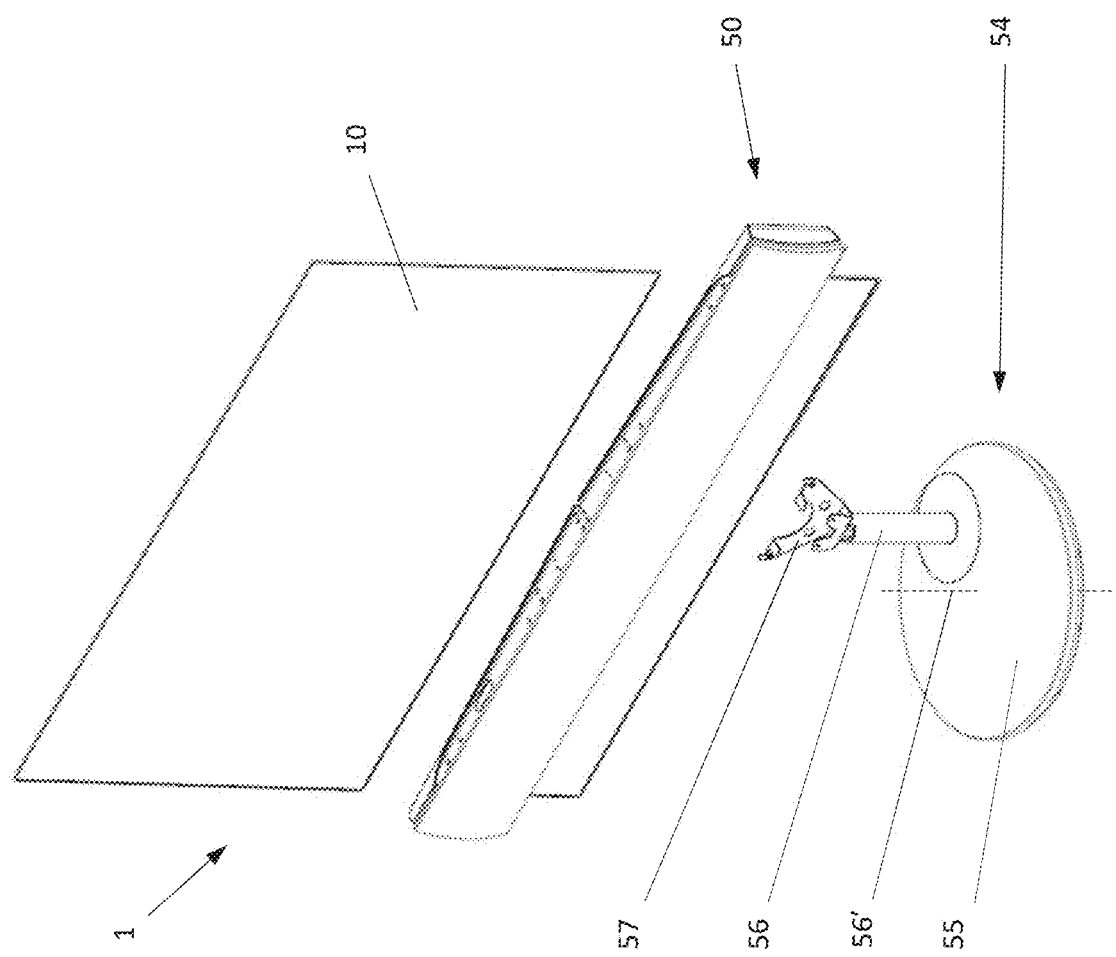
FIG. 4 illustrates the modular audio/video entertainment system provided with a floor or table stand

Alternatively, the audio/video entertainment system 1 may as illustrated with reference to FIG. 4 be provided with a floor or table stand 54. In this embodiment, the floor or table stand 54 is motorized such that it may be remotely controlled to swivel on the swivel plate 55 and rotate around the axle 56 and/or axle 56' whereby the viewing position of the modular audio/video entertainment system may easily be adjusted to any desired angle and viewing position. Naturally the wall mount 51 and the floor or table stand 54 are provided with mounting brackets 57 such that they may be attached to the modular audio/video entertainment system 1 in a rigid and stable manner.

Figure 5:
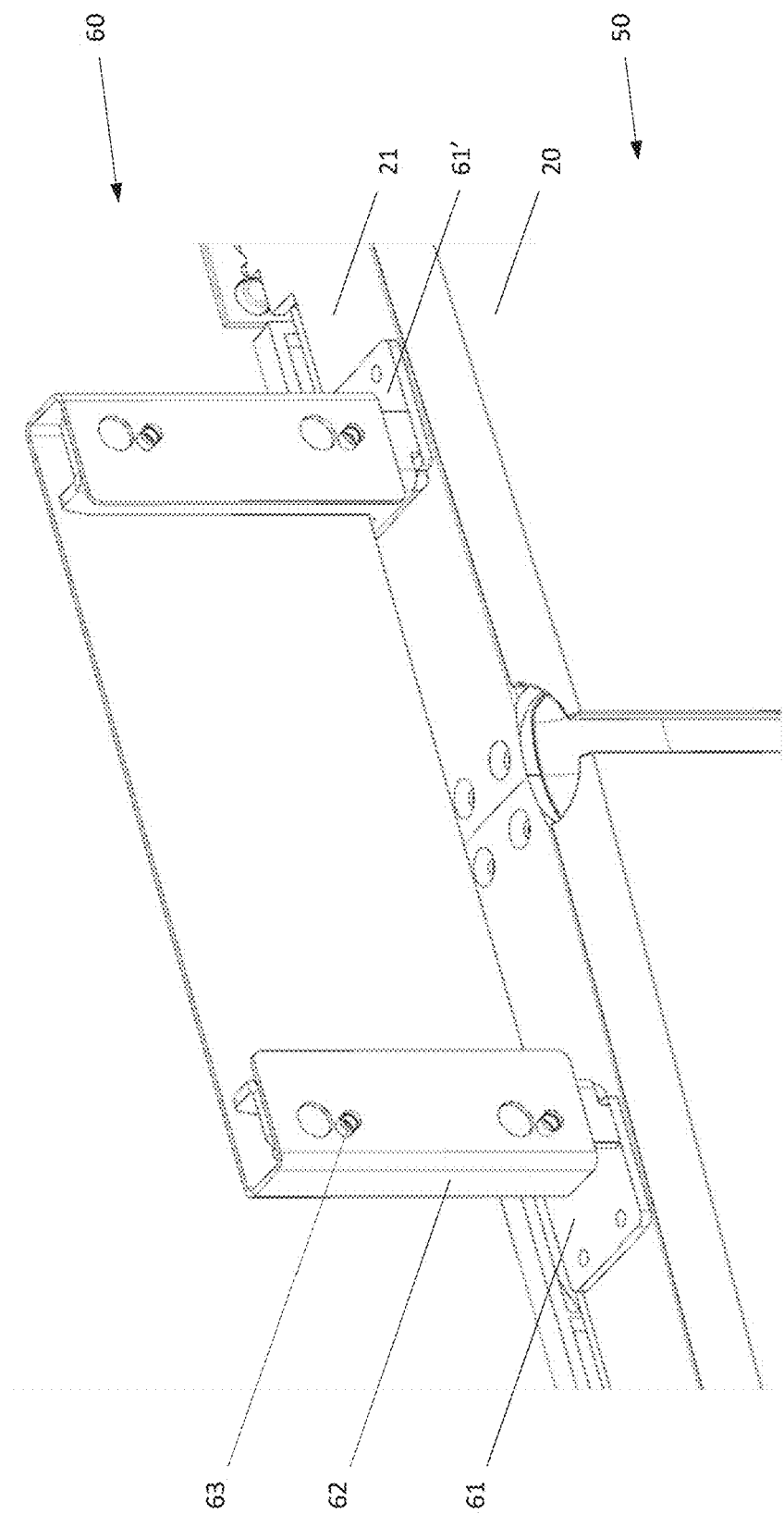
FIG. 5 illustrates bracket assemblies

In order to obtain the rigid and stable connection between the integrated unit 50 and the screen unit 10 one or more bracket assemblies 60, see FIG. 5, are provided. On the top surface 21 of the loudspeaker unit 20 first bracket means 61, 61' are fastened. An interface bracket 62 is provided as an interface between the brackets 61, 61' mounted on the top surface 21 of the integrated unit 50 in this example the loudspeaker unit 20 being uppermost, and therefore the brackets 61, 61' are mounted on a top surface 21 of the loudspeaker unit 20. The interface bracket 62 is mounted to the first brackets 61, 61' and provided with further mounting means 63 which are especially provided as corresponding to the fastening means provided in the back side of a screen unit 10, such that the interface bracket 62 "adjusts" the difference between the mounting means provided in the back of a screen 10 and the mounting brackets 61, 61' provided on the integrated unit 50.

Figure 6:
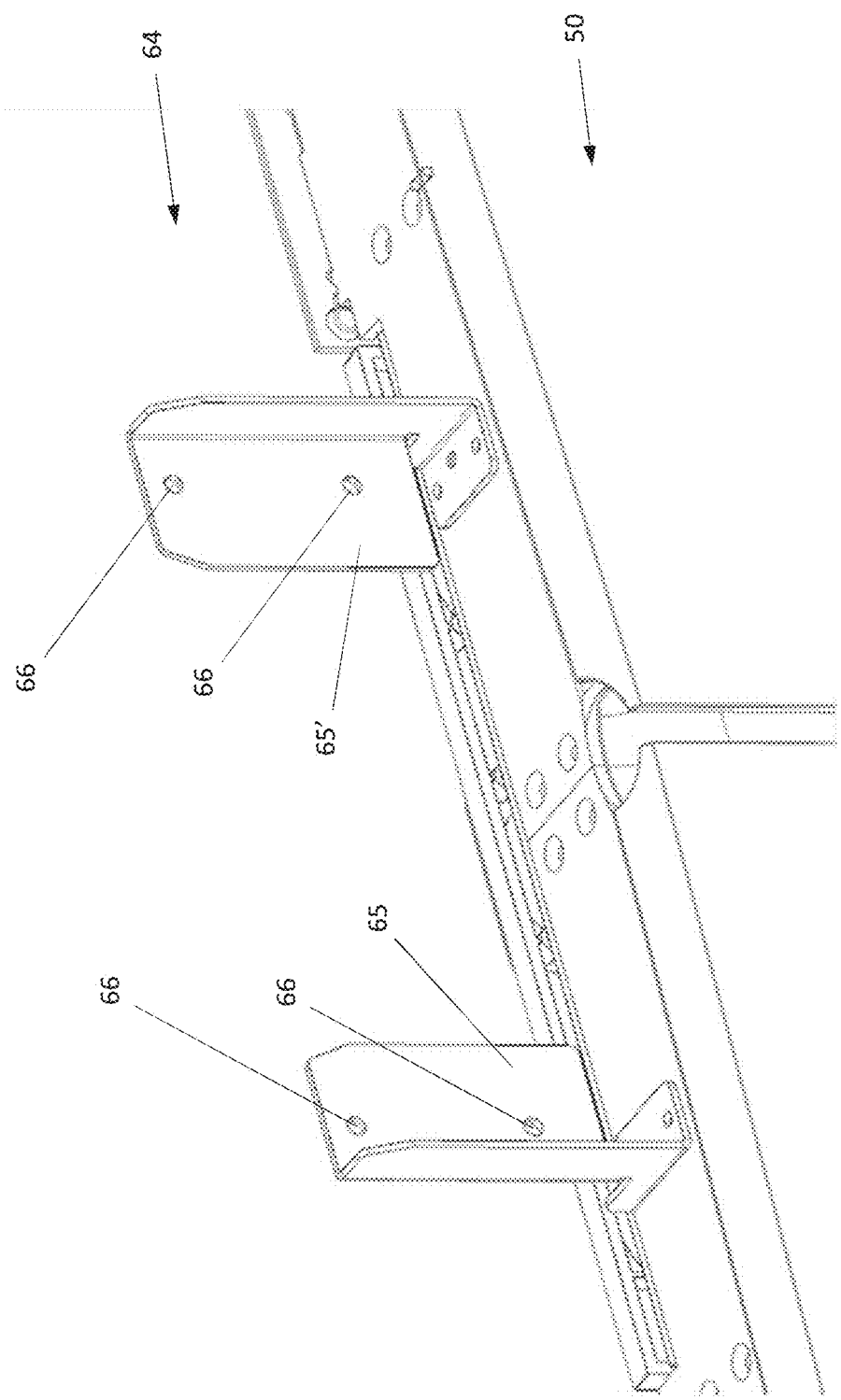
FIG. 6 illustrates a further bracket assembly

In FIG. 6 is illustrated a further bracket assembly 64 also mounted on the integrated unit 50. In this embodiment, the brackets 65, 65' are specifically designed to fit into the rear side 10' of a screen unit as illustrated with reference to FIG. 7. This embodiment is particularly useful where the brackets 65, 65' are designed to a specific brand or series of screens where the mounting means on the screen will be positioned in substantially the same position in a number of generations of screens such that the interface bracket 62 explained above with reference to FIG. 5 becomes superfluous. In this embodiment, the rear side 10' of the screen unit is provided with apertures superposed the apertures 66 in the brackets 65, 65' such that the screen unit 10 may be connected to the brackets 65, 65' by a bolt/screw connection.

As will be explained below the modular audio/video entertainment system 1 may also be provided with a rear cover 70. In order to provide access to the rear of the screen unit 10' a removable cover 70' may be provided such that by removing the removable cover 70' as is illustrated in FIG. 7 the rear side of the screen unit 10' is accessible in order to be able to fasten the mounting brackets 65, 65' directly to the screen's rear surface 10'.

Figure 7:
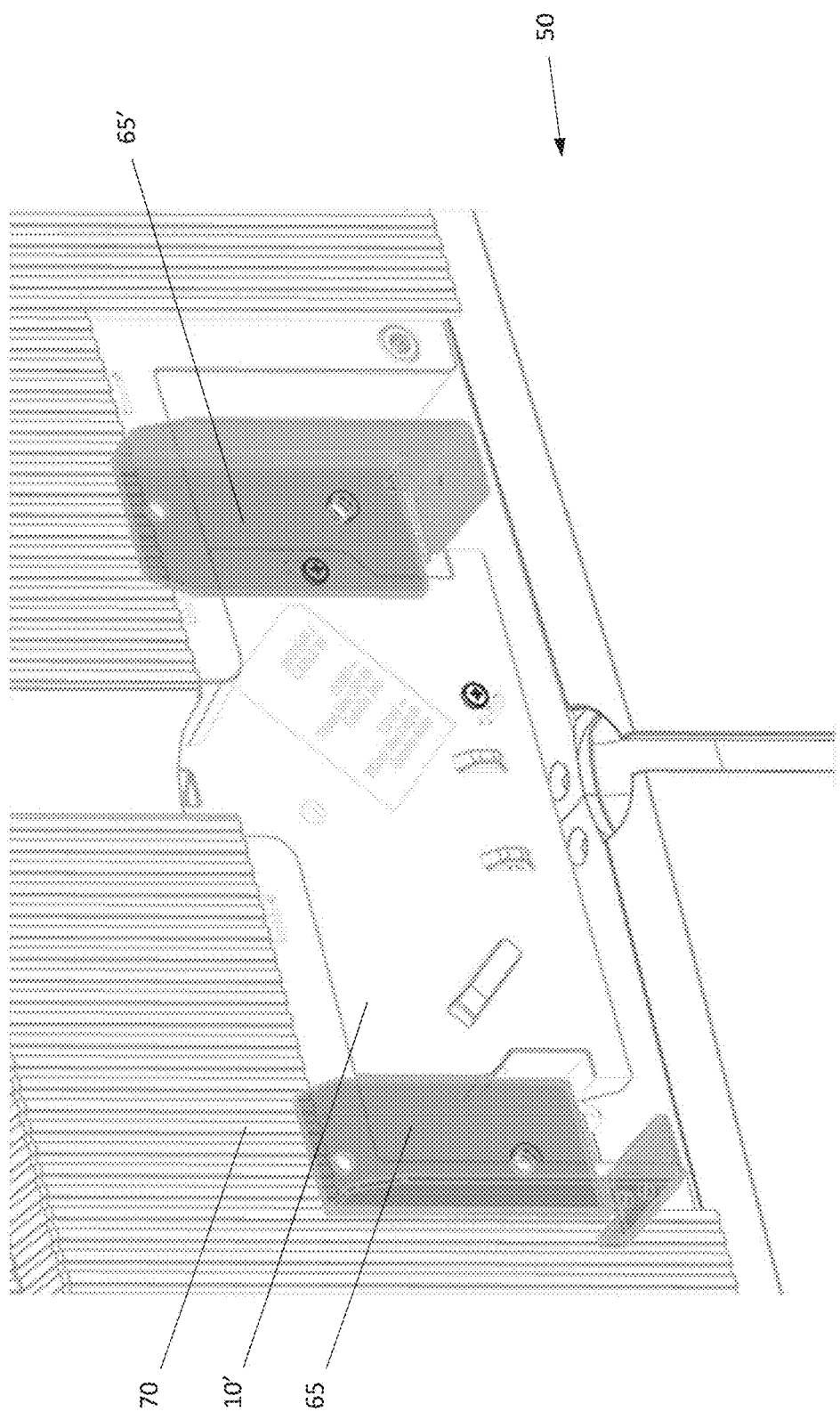
FIG. 7 illustrates brackets specifically designed to fit into the rear side of a screen
Figure 8:
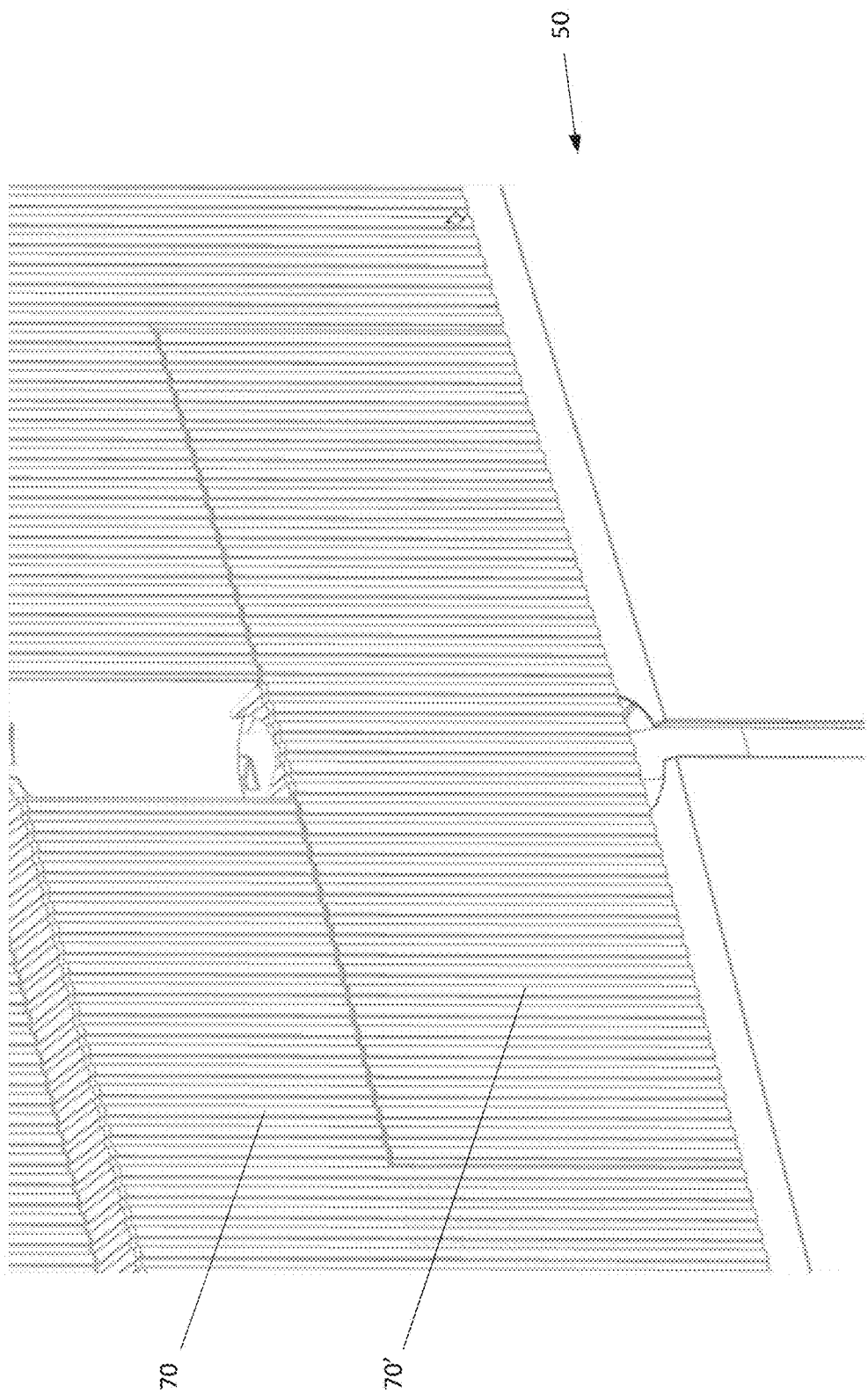
FIG. 8 illustrates a rear view of the modular audio/video entertainment system

In FIG. 8 is illustrated a rear view of the modular audio/video entertainment system where the removable cover 70' is positioned in the rear cover 70 in order to cover the wiring and brackets which would otherwise be visible as indicated with reference to FIG. 7. In this manner, a very clean and neat rear surface is provided in the assembly zone between the screen unit 10 and the integrated unit 50.

Figure 9:
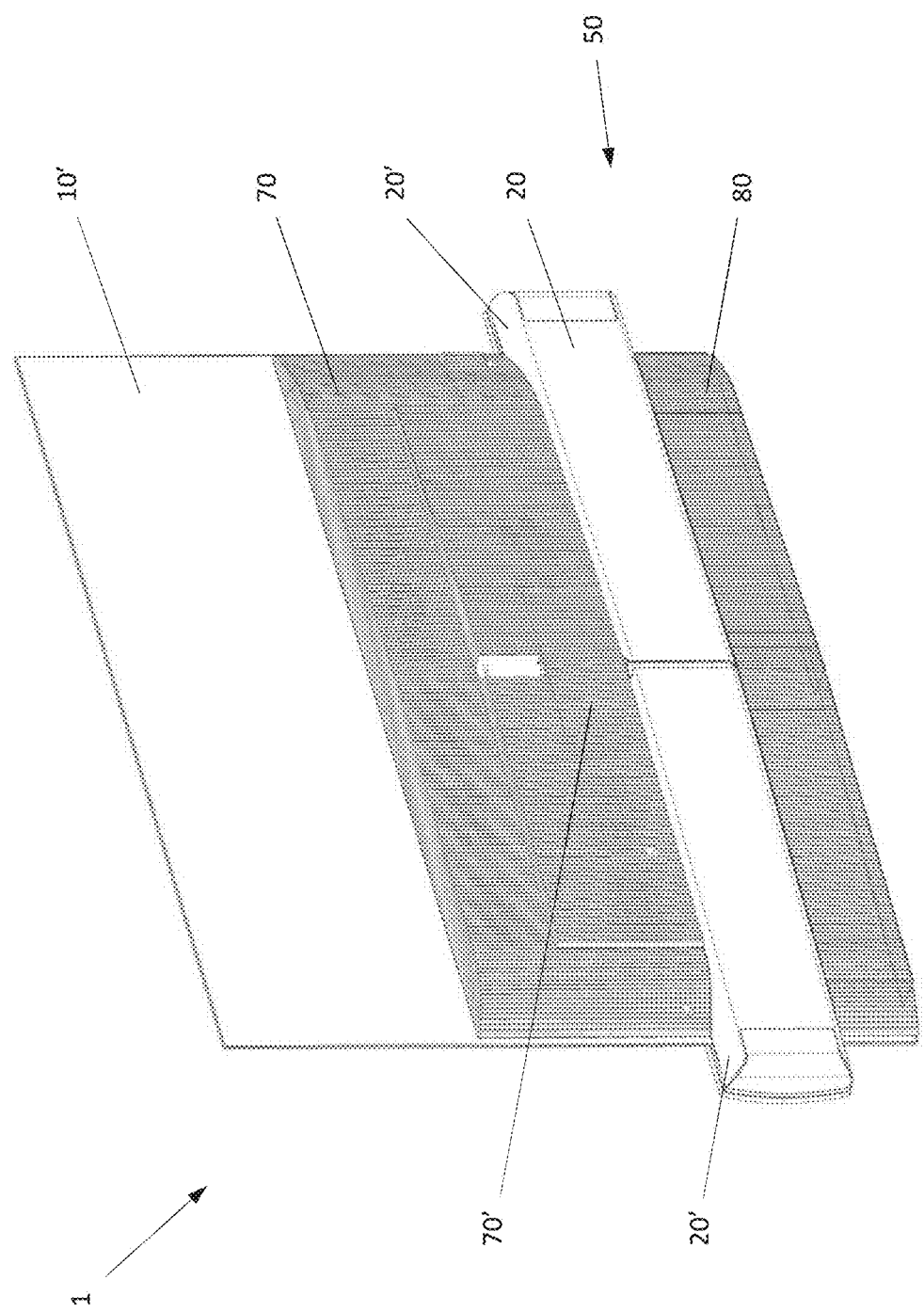
FIG. 9 illustrates a rear view of the complete modular audio/video entertainment system according to the invention

In FIG. 9 is illustrated a rear view of the modular audio/video entertainment system according to the invention where the rear side 10' of the screen unit 10 is partly covered by the cover 70. The rear side of the integrated unit 50 is also provided with standard covers 80 which may be same regardless of which size screen unit 10 is integrated with the system.

Furthermore, the rear cover 70 may be designed to integrate with a smaller size screen such that any larger screens will also be usable with the rear cover 70. In this embodiment depicted in all the figures the loudspeaker unit 20 is wider than the screen unit 10. This means that a portion of the loudspeaker unit 20' extends wider on either side of the screen unit 10.

Figure 10:
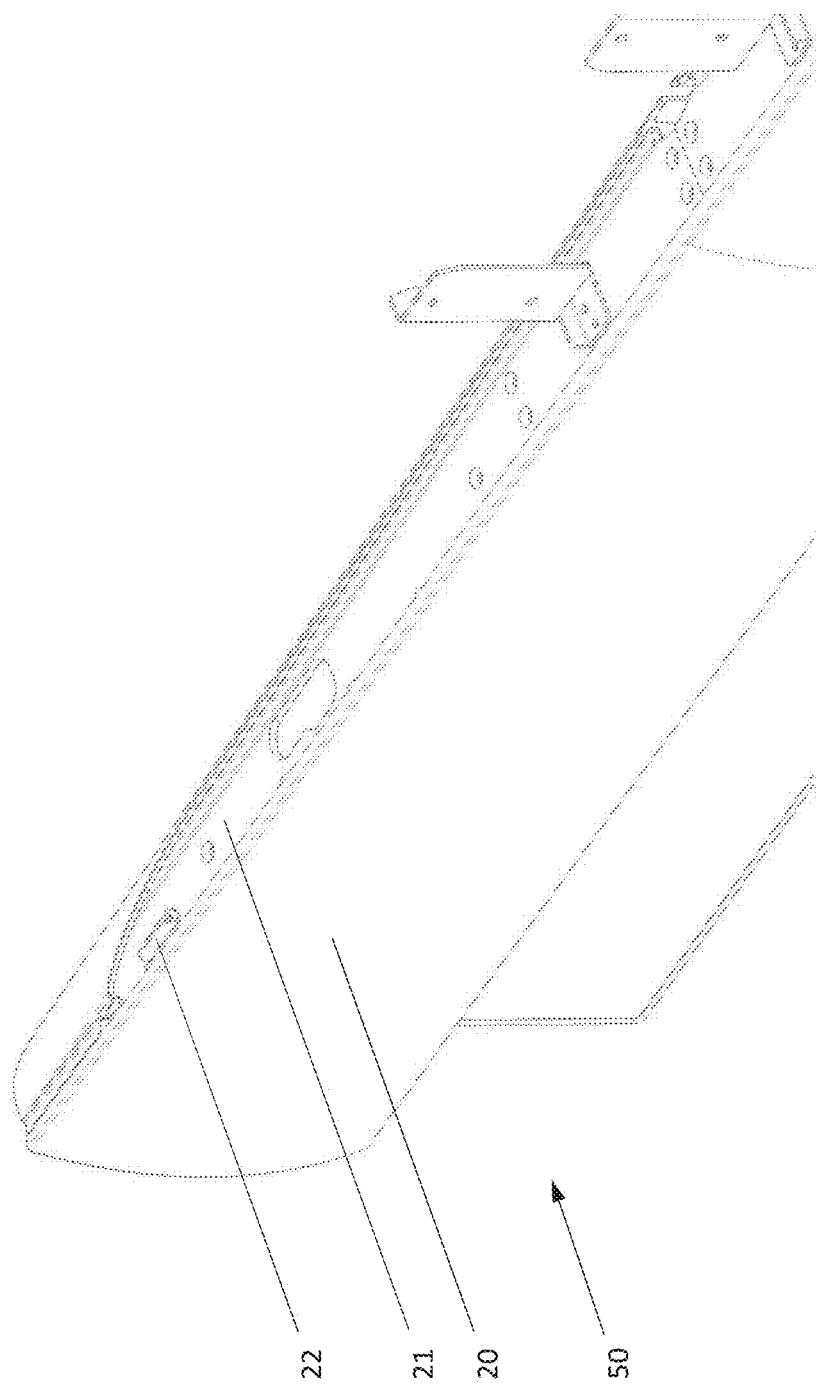
FIG. 10 illustrates an embodiment where the top surface of the loudspeaker unit is provided with an alignment member for the screen unit

In FIG. 10 is illustrated an embodiment where the top surface 21 of the loudspeaker unit 20 is provided with alignment members 22. The alignment members are dimensioned such that they are suitable to be locked in between alignment studs 24, 24' and 24" in the lower edge 11 of the screen unit 10 as illustrated with reference to FIG. 11. Therefore, in addition to being connected by the bracket assemblies, the screen unit 10 and the integrated unit 50 in this embodiment represented by the top surface 21 of the loudspeaker unit are held by the alignment members 22 and the alignment studs 24, 24' and 24" such that a very stable connection is provided, particularly in a direction perpendicular to the screen surface in addition to the bracket assemblies.

The alignment members 22 may be replaced by a ridge (not illustrated) such that the lower edge 11 of the screen unit 10 is pushed against this ridge in order to align the screen unit 10 relative to the loudspeaker unit 20. The bracket assemblies will maintain the screen unit 10 in position relative to the integrated unit 50, but the ridge will provide for a linear surface against which the screen unit 10 may rest such that symmetry is achieved between the integrated member 50 and the mounted screen unit 10.

Figure 11:
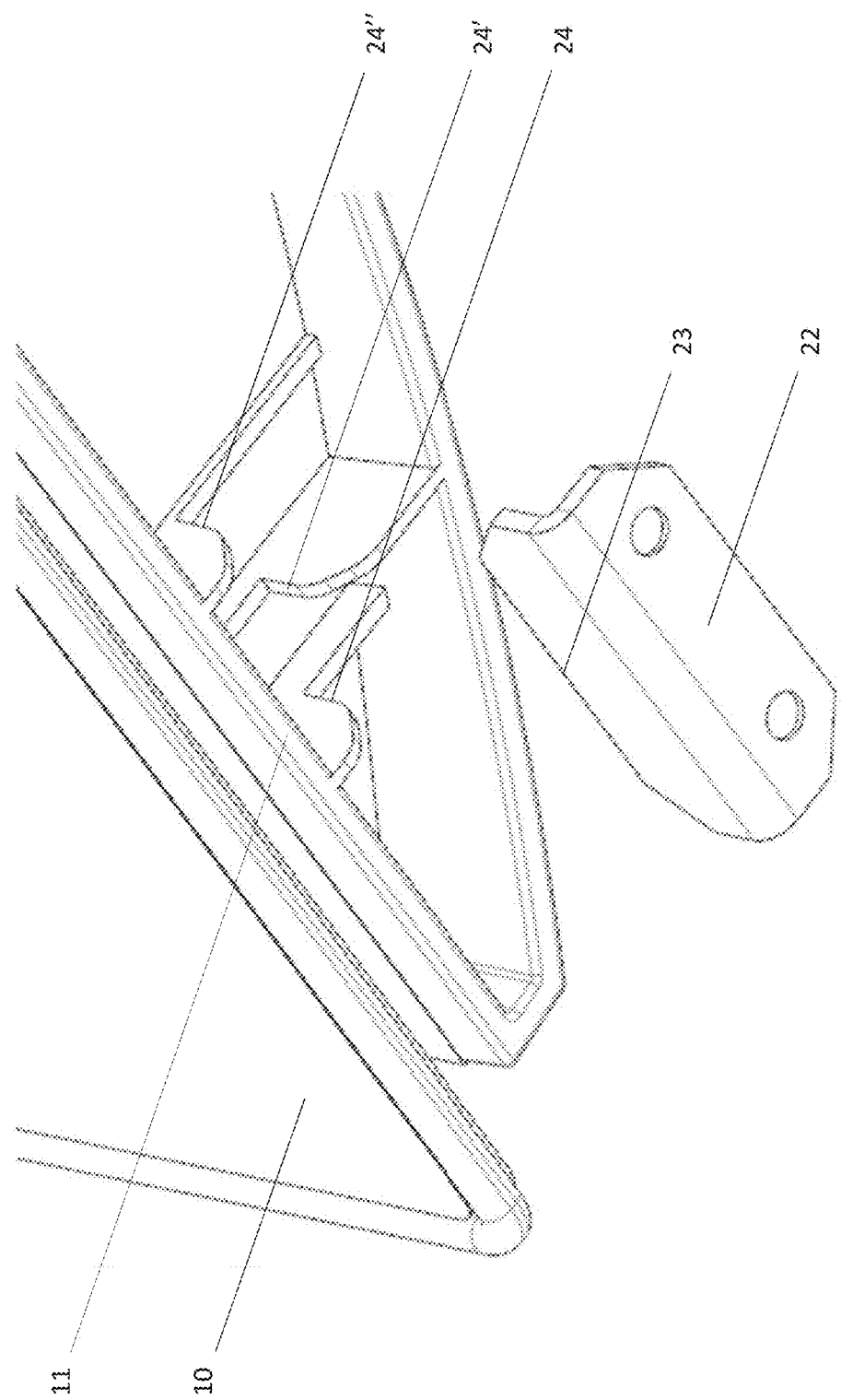
FIG. 11 illustrates alignment studs in the bottom part of the screen unit

Due to the extensions 20' of the loudspeaker unit 20 as discussed above with reference to FIG. 9 and the potential provision of grooves and ridges as discussed with reference to FIGS. 10 and 11 end covers 72, see FIG. 12, may be provided. The end covers 72, particularly the top and bottom parts 72' of the end covers 72, are dimensioned such that the top and bottom parts 72' have an extent corresponding to the extent 20' of the loudspeaker width-wise in comparison to the screen unit 10. The end covers 72 will therefore cover any ridge or groove provided in a top surface of the loudspeaker unit 20 which is not covered by the lower edge of the screen unit 10 and as such present a neat and clean design. The end covers 72 may be provided in any material and with any surface finish, such as for example polished aluminium, wood, black plastics and the like.

When the screen unit 10 is exchanged for a screen unit having a different size, other end covers 72, specifically designed to cover the extensions 20' for that particular new screen unit with respect to the loudspeaker unit 20, are installed, again to achieve a neat and clean design.

Consequently, the loudspeaker unit 20 may be used with a range of sizes of screen units 10 and still present a neat and presentable modular audio/video entertainment system by replacing the end covers making it invisible that the system was not born with a screen unit of that size.

Figure 12:
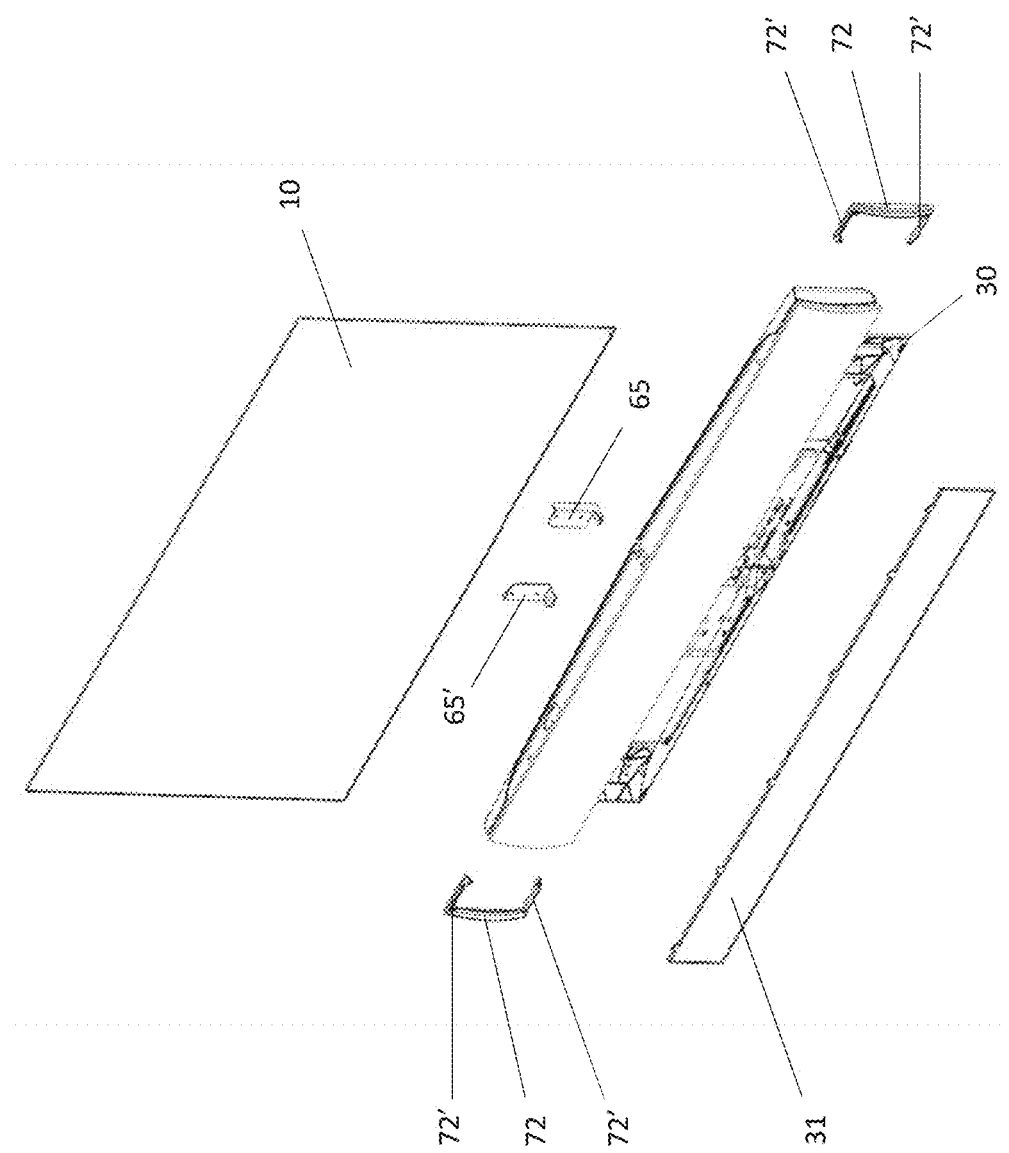
FIG. 12 illustrates assembly details of the loudspeaker end covers and the control unit front cover

Further, as illustrated in FIG. 12, the control unit 30 may also be provided with a front cover 31 having any desired colour, texture etc. In an embodiment, the cover 31 is a glass plate designed to match the appearance of the screen surface and the same width as the screen width, such as to create the impression of a larger, more square-like screen with a loudspeaker unit going across the square-like screen.

Figure 13:
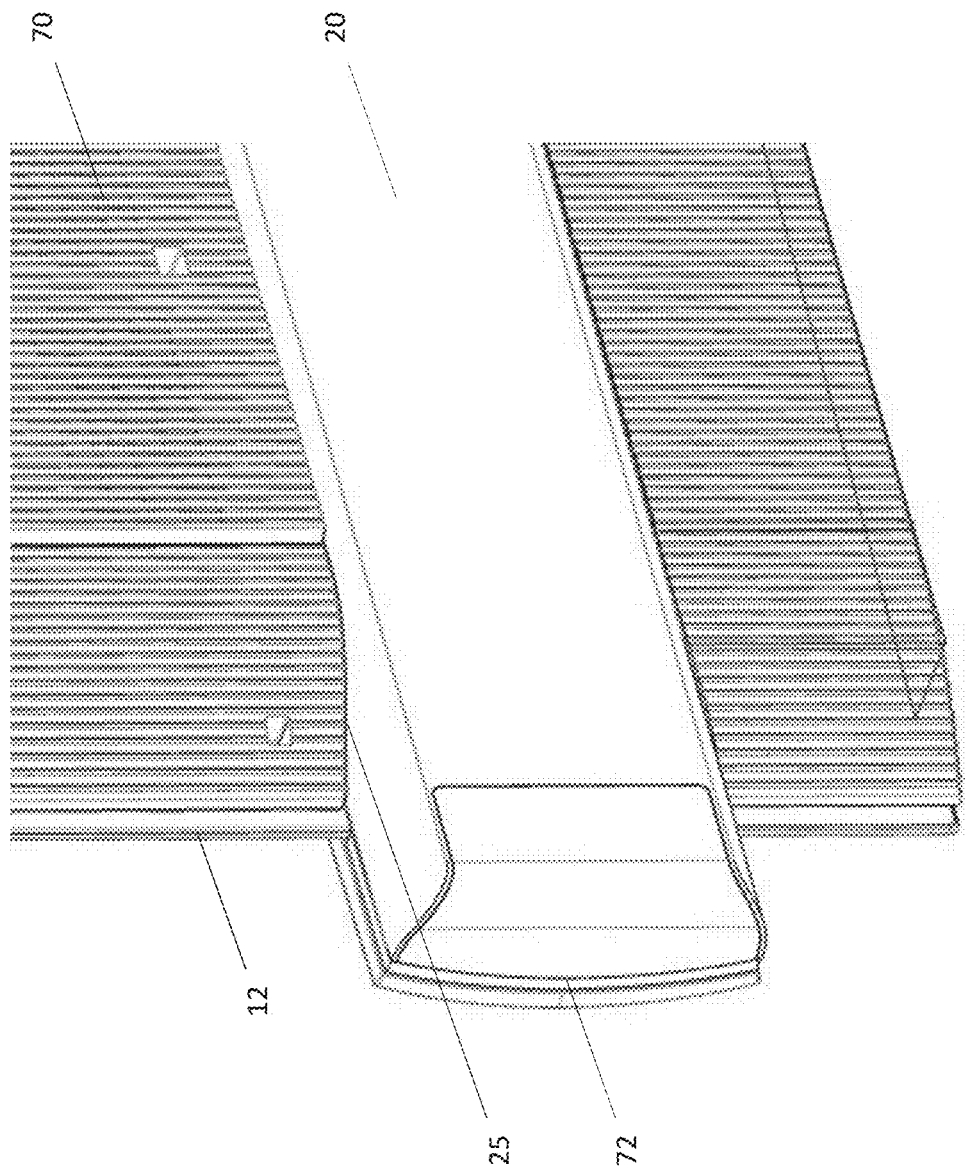
FIG. 13 illustrates an assembly detail of the modular audio/video entertainment system

In FIG. 13 is illustrated an assembly detail of the modular audio/video entertainment system. The loudspeaker unit 20 is provided with end covers 72 such that the distance between the end of the loudspeaker unit 20 and the edge 12 of the screen unit 10 is covered. Furthermore, the cover 70 is provided on the rear side of the screen unit 10 such that a nice, curved edge 25 is provided between the loudspeaker unit 20 and the cover 70.

Figure 14:
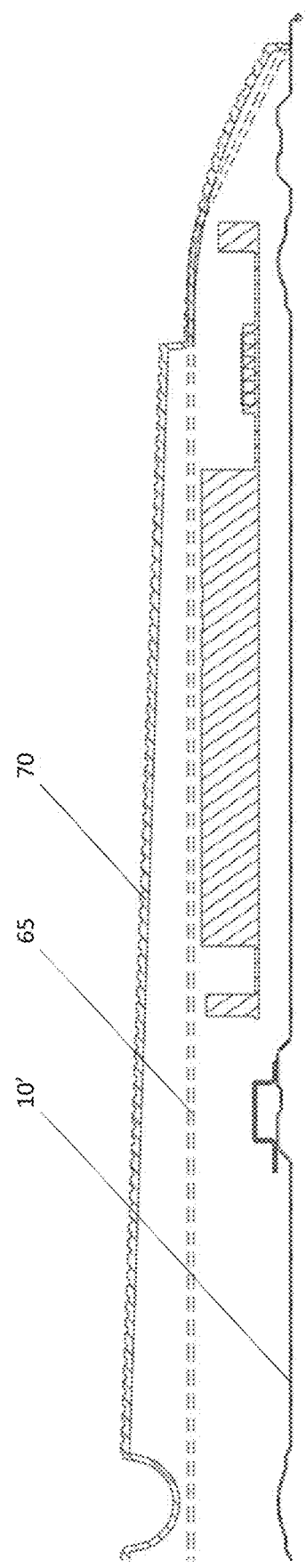
FIG. 14 illustrates a view of a horizontal cross-section through the screen unit

In FIG. 14 a view of a horizontal cross-section through the screen unit 10 is illustrated. The rear cover 70 is seen to have a curved section which covers the rear side 10' of the screen unit 10 as well as the mounting bracket assemblies 60 such that a clean and neat rear surface is also provided due to the provision of the cover 70. The rear cover 70 has been customised for this particular audio/video entertainment system. The dotted rear cover (65 in FIG. 14) has been replaced by rear cover 70.

Figure 15:
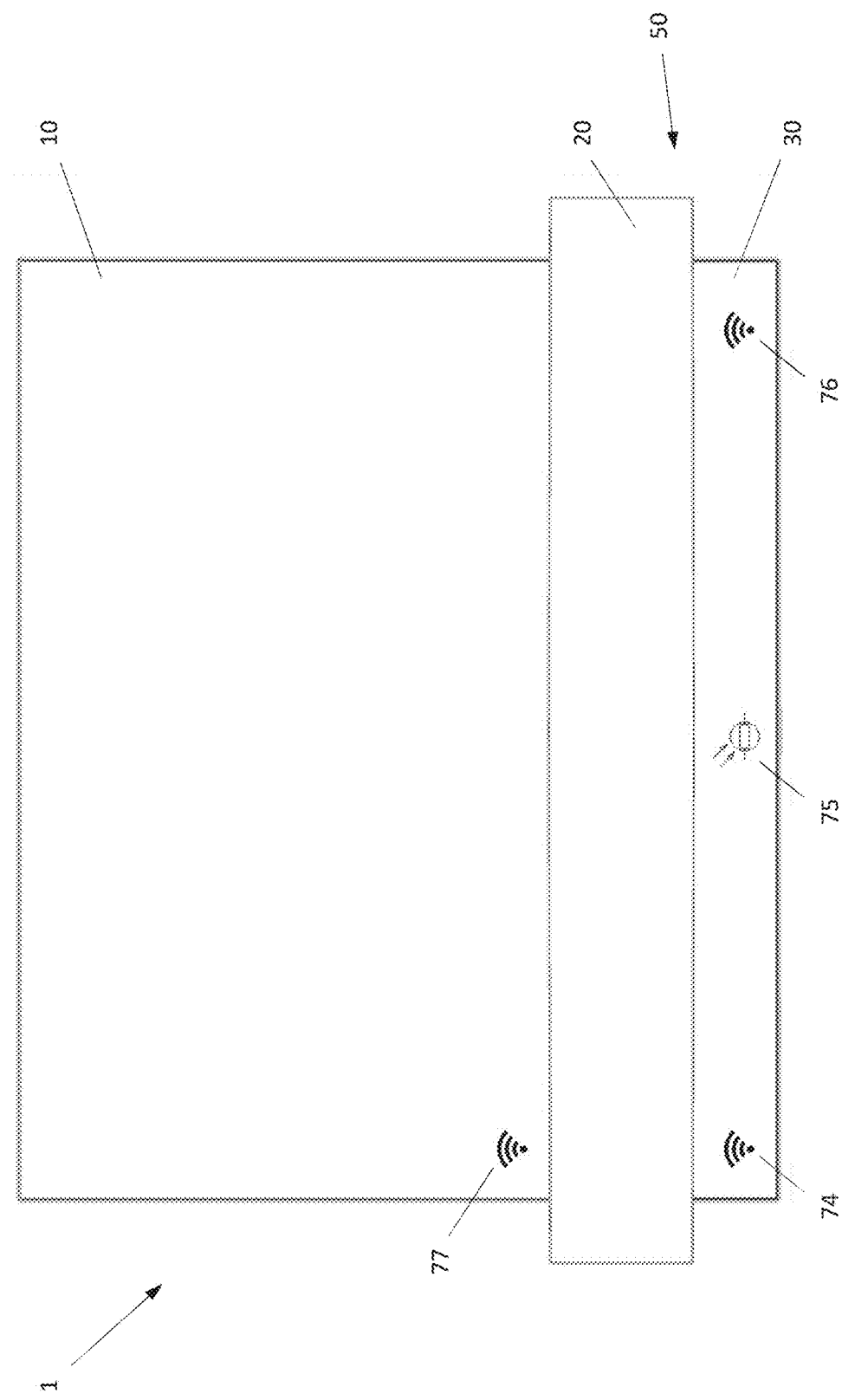
FIG. 15 illustrates examples of sensors and antennae/transceivers of the modular audio/video entertainment system

In order to communicate with the audio/video entertainment system 1, the audio/video entertainment system 1 may be provided with a number of sensors and antennae/transceivers as illustrated with reference to FIG. 15. In this embodiment, only a few of the possible sensors are mentioned, for example a Wi-Fi®/Bluetooth® antenna/transceiver 74 may be provided in the front surface of the control unit 30 such that a user may communicate with the control unit 30 or have access to the internet thereby using the audio/video entertainment system as a smart TV or an audio streaming device. Furthermore, a light sensor 75 is provided in order to detect ambient light which is used to control the brightness and other settings of the picture on the screen unit 10. Furthermore, a wireless loudspeaker antenna/transceiver 76 is provided allowing the audio/video entertainment system 1 to communicate with a plurality of wireless loudspeakers (not illustrated) in addition to the built-in loudspeaker unit 20. Additionally, the WiFi®/Bluetooth® antenna/transceiver 77 of the screen unit 10 can be used to stream smart TV content directly to the screen unit 10 without occupying the Wi-Fi®/Bluetooth® antenna/transceiver 74 in the control unit 30.

The invention claimed is:

1. A single integrated modular audio/video entertainment system, comprising:
   three modules, a screen unit,
   a loudspeaker unit,
   a control unit,
   means for assembling and disassembling said three modules, said means comprising one or more bracket assemblies,
   wherein one end of the one or more bracket assemblies is fastened in the loudspeaker unit, and another end of the one or more bracket assemblies engages rear or bottom sides of the screen unit,
   wherein the loudspeaker unit has a front surface having a first width and a first height, one or more loudspeaker transducers arranged for emitting sound from said front surface, said loudspeaker unit further having a first bottom, first top, and two first side surfaces connected to said front surface defining a first depth,
   wherein said screen unit has a front screen surface, said front screen surface having a second width and a second height, and second bottom, second top and two second side surfaces connected to said front screen surface defining a second depth,
   wherein the control unit has a front surface having a third width and a third height, and third bottom, third top and two third side surfaces connected to said front surface defining a third depth,
   wherein end covers are provided in order to cover a section of a groove or ridge in which the screen unit is placed provided in at the first top surface of the loudspeaker unit, not being covered by the second bottom surface of the screen unit when the screen unit is connected to the loudspeaker unit.

2. The single integrated modular audio/video entertainment system according to claim 1, wherein:
   the control unit and the loudspeaker unit is one integrated member, and that an upper part of the integrated member comprises a first mounting bracket being part of the one or more bracket assemblies, said mounting bracket has means for being fastened to an interface bracket, and said interface bracket has means for engaging the rear side of the screen unit.

3. The single integrated modular audio/video entertainment system according to claim 1, wherein:
   the control unit and the loudspeaker unit is one integrated member, and an upper part of the integrated member includes a mounting bracket, said mounting bracket has one or more mounting surfaces, the mounting surfaces are provided with means for engaging the back and/or bottom of the screen unit.

4. The single integrated modular audio/video entertainment system according to claim 3, wherein:
   the corresponding means in the rear side of the screen are the mounting means of the screen unit used for mounting the screen unit to a table or floor stand or wall mount.

5. The single integrated modular audio/video entertainment system according to claim 1, wherein:
   the system further comprises a rear cover, said cover has an upper surface and a lower edge as well as a sectionwise curved surface connecting said upper surface and lower edge.

6. The single integrated modular audio/video entertainment system, according to claim 1, wherein: the first top surface of the loudspeaker unit is provided with the groove or ridge in which the screen unit is placed for obtaining a fixed and common mounting plane between the loudspeaker unit and the screen unit.

7. The single integrated modular audio/video entertainment system according to claim 6, wherein: different end covers are provided for different screen widths, said end covers having one or more of the following characteristics different from the loudspeaker unit and/or screen unit: surface texture, color, width, or material.

8. The single integrated modular audio/video entertainment system according to claim 1, wherein:
   the bracket assemblies comprise interface means for attachment to a wall mount hinge.

9. The single integrated modular audio/video entertainment system according to claim 1, wherein:
   the control unit comprises a communication module able to communicate with a remote control.

10. The single integrated modular audio/video entertainment system according to claim 1, wherein:
    the control unit further comprises a wireless antenna/transceiver and/or a wireless loudspeaker antenna/transceiver to enable control of sound reproduction and/or signal processing for the screen unit and, wherein the modular audio/video entertainment system can communicate with a plurality of wireless loudspeakers.

* * * * *